(12) United States Patent
Kobayashi

(10) Patent No.: US 7,952,723 B2
(45) Date of Patent: May 31, 2011

(54) OPTICAL COHERENCE TOMOGRAPHY APPARATUS

(75) Inventor: Koji Kobayashi, Chofu (JP)

(73) Assignee: Kowa Company Ltd. (JP)

( * ) Notice: Subject to any disclaimer, the term of this patent is extended or adjusted under 35 U.S.C. 154(b) by 346 days.

(21) Appl. No.: 12/315,797

(22) Filed: Dec. 5, 2008

(65) Prior Publication Data

US 2010/0141954 A1 Jun. 10, 2010

(51) Int. Cl.
*G01B 11/02* (2006.01)
(52) U.S. Cl. ........................................... 356/497
(58) Field of Classification Search .................. 356/497, 356/479, 511, 480
See application file for complete search history.

(56) References Cited

U.S. PATENT DOCUMENTS

| | | | | |
|---|---|---|---|---|
| 5,353,073 A | * | 10/1994 | Kobayashi | 351/221 |
| 7,480,058 B2 | * | 1/2009 | Zhao et al. | 356/497 |
| 2006/0039004 A1 | * | 2/2006 | de Boer et al. | 356/479 |
| 2006/0066869 A1 | * | 3/2006 | Ueno et al. | 356/497 |
| 2007/0127033 A1 | * | 6/2007 | Ueno | 356/497 |

* cited by examiner

*Primary Examiner* — Tarifur Chowdhury
*Assistant Examiner* — Jonathan M Hansen
(74) *Attorney, Agent, or Firm* — Adams & Wilks

(57) ABSTRACT

An optical coherence tomography apparatus includes a light source for generating a low-coherent light beam, which is split into a probe light beam toward the object and a reference light beam toward a reference optical path. The probe light beam is swept one-dimensionally at a predetermined frequency. An interference light beam is produced by interference between the probe light beam from the object and the reference light beam that has traveled along the reference optical path. The interference light beam is re-swept in the same direction and at the same frequency as the probe light beam. A two-dimensional image-capturing device detects the re-swept interference light beam at a frame rate corresponding to the light beam sweeping frequency and produces a video signal, which is processed to provide reflection intensity information of an interior of an object to be measured. Since the two-dimensional image-capturing means is employed and interference information is obtained using low-speed beam sweeping and re-sweeping means, a scanning optical system can be straightforwardly constructed.

21 Claims, 4 Drawing Sheets

OPTICAL COHERENCE TOMOGRAPHY APPARATUS

BACKGROUND OF THE INVENTION

1. Field of the Invention

The present invention relates to an optical coherence tomography apparatus, and in particular relates to an optical coherence tomography apparatus wherein a light beam from a light source is swept to irradiate a predetermined area of an object to be observed, and optical interference is used to detect light reflected from the object in order to obtain tomographic information of the object.

2. Description of the Prior Art

Apparatuses in which interference from a low-coherent light (partially coherent light) is used to create an image from tomographic information of an object to be observed (optical coherence tomography (OCT)) have conventionally made it possible to form and observe a desired tomographic image of the object in a contactless and noninvasive manner. Accordingly, such apparatuses are particularly useful when observing living organisms, and have started to be used in routine clinical opthalmological examinations, dermatological diagnoses, endoscopic applications and other medical operations. They have also been considered to be useful in regard to applications involving testing equipment in industrial fields.

For example, Document D1, Japanese Laid-open Patent Publication No. 1992-174345 (Japanese Examined Patent Application (Kokoku) No. 1994-35946), discloses an example of early OCT in which irradiation light is shifted in frequency to generate a reference beam, which is combined with light reflected from an object to be measured to produce a beat component. The beat component is then detected to obtain a reflected tomographic image of the object.

Document D2, Japanese Laid-open PCT Publication 1994-511312 (Patent No. 3479069), discloses an apparatus comprising an interferometer that has a light source having short coherence length characteristics and an optic fiber, phase modulation means and a lateral sweeping mechanism that are disposed on an optical path of a probe light beam toward a sample, an ultrasonic light modulation element disposed on an optical path of a reference light beam, control means for moving an optical path length in the light axis direction, and the like. In this arrangement, interference light created by the reference light beam and the probe light beam guided via the optic fiber is detected to obtain an image of a tomographic image of the sample.

Document D3, Japanese Laid-open Patent Publication No. 2000-126188 (Patent No. 3318295), discloses an optical tomography observation apparatus including a light source for generating low-coherent light and an optic fiber interferometer. The apparatus is usefully combined with a structure constituting an end part of an endoscope, body cavity scope, or other instrument via one optical path of the interferometer. Document D3 discloses a technique involving the use of the endoscope or other instrument inserted into a body cavity, wherein a CCD or other device provided as a conventional observation device is used to provide a two-dimensional reflected image of a diseased tissue and a tomographic image in the depth direction thereof that is obtained by detecting an interference signal from an interferometer.

Document D4, Japanese Laid-open Patent Publication No. 1996-206075 (Patent No. 3549961), discloses a configuration wherein a light beam generated by a light source is split into a sample beam path and a reference beam path, the light beams that returns via the paths are superimposed and guided to a detection beam path, and an interference signal obtained by a detector is processed to derive therefrom a tomographic image of a cornea in an eye of a subject. In Document D4, a helical reference mirror provided on the reference beam path is used to perform a scan in the optical axis direction, and a reflective mirror on the reference beam path is then moved to perform a depth scanning in accordance with the curve of the cornea, thereby reducing time for data collection.

Document D5, Japanese Laid-open Patent Publication No. 1998-332329 (Patent No. 3332802), discloses a configuration that employs a semiconductor laser light source with a beam frequency capable of being swept, a Michelson interferometer, and a one- or two-dimensional image-capturing device. A video signal that is output in the frequency sweeping period is subjected to Fourier transformation to produce a tomographic image. Such a system is advantageous in that a sweeping mechanism for performing a mechanical movement in the optical axis direction is not additionally required, a stable interference optical system can be established, and measurements can be obtained in a short amount of time.

Document D6. Japanese Laid-open Patent Publication No. 1999-325849, discloses a configuration wherein a light beam is split into a reference arm and a measuring arm, and a spectrograph is used to detect the intensity of light that is produced by interference of a measuring beam obtained via the measuring arm with a reference beam obtained through the reference arm. The reference arm is provided with means for changing the phase of the light, and a signal from the spectrograph is analyzed to produce an optical tomographic image of a transparent, partly transparent, or opaque object.

Document D7, Japanese Laid-open PCT Publication No. 2003-516531, discloses an optical mapping device wherein an optic fiber interferometer and a bulk interferometer are used in combination, modulating means is introduced into one optical path, means is provided for changing the length of the optical path, and tomographic information in the depth direction of an object is derived based on an output signal from the interferometers.

Document D8, Japanese Laid-open Patent Publication No. 2001-330558 (Patent No. 3594875), discloses a system wherein a light beam from a light source is split into a signal optical path that passes through an object to be measured and a reference optical path that travels via a predetermined reflecting mirror, and an interference optical system is provided with two CCD sensors for receiving a periodically isolated interference beam that is split into two. The two CCD sensors receive interference light pulses that have different phases and produce signals, which are processed to provide image information of an interior layer of the object.

Document D9, Japanese Laid-open Patent Publication No. 2005-245740, discloses an OCT apparatus with an interferometer comprising means for forming a plurality of interference images differing in phase, and means for extracting the plurality of interference images by high-speed switching. The plurality of extracted interference images are detected using CCD image sensors, and the plurality of detected images is processed to form a tomographic image.

Document D10, Japanese Laid-open Patent Publication No. 2006-116028, discloses a measuring device composed of an interferometer and a spectrometer, wherein a light beam from a light source is focused into the shape of a line on an object being measured, and the observation light from the object being measured is detected by a two-dimensional image sensor via a spectrometer. The detected signal from the image sensor is subjected to Fourier transformation and other calculation processing, whereby sectional information of the object to be measured is quickly obtained according to the rate of computation.

Document D11, Japanese Laid-open Patent Publication No. 2006-322767, discloses a configuration in which a light beam from a light source is split into a probe beam and a reference beam, and the probe beam is directed on an object to be measured via moving means used for movement in the optical axis direction and means for performing an orthogonal scanning in relation to the optical axis. Light reflected from the object to be measured mixes with the reference beam traveling via a fixed reflection surface to produce interference light, which is detected in accordance with the sweeping of the sweeping means and movement means to provide reflective intensity information of the interior of the object.

However, the scanning in the depth direction of the object to be observed in Documents D1 through D4 is performed by moving a reflective mirror for a reference beam in the optical axis direction. Therefore, the focus of the irradiation light (probe light) directed on the object to be observed cannot be optimally maintained for the entire region of the tomographic image, and complications are encountered in achieving higher levels of resolution in the in-plane direction orthogonal to the optical axis (depth direction). Additionally, in the configurations shown in the above Documents, the movement of the reflective mirror in the optical path of the reference light limits the rate at which the detection signal is processed, making it difficult to obtain the tomographic image of the object at high speed.

In contrast, Document D5 discloses an OCT system using a light source with a light wavelength swept (also referred to as "swept source method"). Problems are presented with this system in that a specialized type of laser light source that can stably control the frequency of the light over a desired range is required; a light source of this type is limited in terms of variety, wavelength range, and other aspects; and the light source itself is expensive.

Document D6 discloses an OCT system in which a spectrograph is used in the detection system ("spectral-domain method"). Advantages of this system are that the tomographic information is extracted based on numeric calculations, making mechanical scanning in the depth direction unnecessary; however, problems are presented in that the characteristics of the spectrograph limit the measurement range in the depth direction, and resolution is not readily improved in the direction orthogonal to the depth direction.

The configuration shown in Document D7 is advantageous in that a scanned reflection image and a tomographic image are simultaneously obtained. However, problems are presented in that the rate at which images are captured depends on light beam sweeping being performed over two optical axes, and the rate at which images are captured cannot readily be increased without the use of expensive modulating means or a specialized scanning system.

The configuration disclosed in Document D8 is advantageous in that tomographic images can be extracted at high speed via a simple computation process according to the video rate of a CCD camera. However, problems are presented with this system in that accurate positioning of the two CCD devices is difficult, and when a living organism or other object having a strong scatter factor is observed, the presence of strong background light superimposed as a direct-current component in the detector makes it difficult to improve the gradation of a signal component that contains tomographic information.

In the configuration shown in Document D9, advantages are presented in that a tomographic image can be obtained at high speed using a simple computation process. However, drawbacks are presented in that the light source is not used efficiently, and a high-cost, specialized switching light source or other such configuration is necessary when the system is implemented in practice. Additionally, the system in Document D9 has the same problems as in Document D8; i.e., when a living organism or other object having a strong scatter factor is observed, the presence of strong background light superimposed as a direct-current component in the detector makes it difficult to improve the gradation of a signal component that contains tomographic information.

Document D10 discloses a spectral domain system that improves the invention described in Document D6. The system in Document D10 requires no mechanical sweeping, and enables images of cross-sectional information to be obtained at high speed. However, the same problems as in Document D6 are also presented in this system, insofar as the measurement range in the depth direction is limited by the characteristics of the spectrograph, and the resolution is not readily increased in the direction orthogonal to the depth direction.

Document D11 proposes a system having good practical utility wherein the resolution is improved in the direction orthogonal to the optical axis, and improvements are also made while taking into account practical aspects such as the cost of the devices and the simplicity of adjustment in the optical system. However, in this system, increasing the speed of the modulating means is particularly difficult, and the time necessary to obtain one plane of a tomographic image cannot readily exceed, for example, two to three frames per second. Therefore, a problem is presented in applications involving fast-moving living organisms.

It is therefore an object of the invention is to provide a highly practical optical coherence tomography apparatus with a simpler and less expensive configuration that makes it possible to observe tomographic images of an object at high speed, for example, at 30 or more frames per second, while preserving high levels of resolution, gradation, and contrast.

SUMMARY OF THE INVENTION

The present invention relates to an optical coherence tomography apparatus in which a light beam from a light source is swept to irradiate a predetermined region of an object to be observed, and optical interference is used to detect light reflected from the object in order to derive therefrom tomographic information of the object. The apparatus comprises a light source for generating a low-coherent light beam; a beam splitting element for splitting the light beam from the light source into a probe light beam toward the object and a reference light beam toward a reference optical path; light sweeping means for one-dimensionally sweeping the probe light beam at a predetermined frequency; re-sweeping means for sweeping in the same direction and at the same frequency as the light sweeping means an interference light beam that is produced by interference between the probe light beam from the object and the reference light beam that has traveled along the reference optical path; two-dimensional image-capturing means for detecting the re-swept interference light beam at a frame rate corresponding to a sweeping frequency of the light sweeping means and the re-sweeping means; and signal processing means for processing a video signal output from the two-dimensional image-capturing means to derive therefrom reflection intensity information of an interior of the object.

An optical coherence tomography apparatus according to the present invention also comprises a light source for generating a low-coherent light beam; a beam splitting element for splitting the light beam from the light source into a probe light beam toward the object and a reference light beam toward a reference optical path; light sweeping means for one-dimensionally sweeping the probe light beam at a predetermined frequency; light modulating means for modulating the reference light beam such that the phase thereof periodically shifts at a higher frequency than the sweeping frequency of the light sweeping means; re-sweeping means for sweeping in the same direction and at the same frequency as the light sweeping means an interference light beam that is produced by interference between the probe light beam from the object and the reference light beam that is modulated by the light modulating means; two-dimensional image-capturing means for detecting the re-swept interference light beam at a frame rate corresponding to a sweeping frequency of the light sweeping means and the re-sweeping means; and signal processing means for processing a video signal from the two-dimensional image-capturing means to extract interference information dependent on light modulation by the light modulation means and derive therefrom reflection intensity information of an interior of the object.

Furthermore, an optical coherence tomography apparatus according to the present invention comprises a light source for generating a low-coherent light beam; a beam splitting element for splitting the light beam from the light source into a probe light beam toward the object and a reference light beam toward a reference optical path; light sweeping means for one-dimensionally sweeping the probe light beam at a predetermined frequency; light modulating means for modulating the reference light beam such that the phase thereof periodically shifts at a higher frequency than the sweeping frequency of the light sweeping means; a recursive optical system for guiding to the light sweeping means an interference light beam that is produced by interference between the probe light beam from the object and the reference light beam that is modulated by the light modulating means; two-dimensional image-capturing means for detecting the interference light beam that has passed through the recursive optical system at a frame rate corresponding to a sweeping frequency of the light sweeping means; and signal processing means for processing a video signal from the two-dimensional image-capturing means to extract interference information dependent on light modulation by the light modulation means and derive therefrom reflection intensity information of an interior of the object.

Moreover, an optical coherence tomography apparatus according to the present invention comprises a light source for generating a low-coherent light beam; a beam splitting element for splitting the light beam from the light source into a probe light beam toward the object and a reference light beam toward a reference optical path; first light sweeping means for one-dimensionally sweeping the probe light beam at a predetermined frequency; light modulating means for modulating the reference light beam such that the phase thereof periodically shifts at a higher frequency than the sweeping frequency of the first light sweeping means; second light sweeping means for sweeping in the same direction and at the same frequency as the first light sweeping means an interference light beam that is produced by interference between the probe light beam from the object and the reference light beam that is modulated by the light modulating means; two-dimensional image-capturing means for detecting the interference light beam that has passed through the second light sweeping means at a frame rate corresponding to a sweeping frequency of the first and second light sweeping means; and signal processing means for processing a video signal from the two-dimensional image-capturing means to extract interference information dependent on light modulation by the light modulation means and derive therefrom reflection intensity information of an interior of the object.

According to the present invention, two-dimensional image-capturing means is employed as a detector for detecting interference light, while means for sweeping and re-sweeping light beams are at low-speed corresponding to the frame rate of the image-capturing means. Accordingly, the scanning optical system can be simplified, and electronic control is facilitated.

Moreover, the present invention provides the effects of a confocal optical system and a low-coherence interferometer, making it possible that a tomographic image (cross-sectional image in the direction vertical to the optical axis) having a high resolution, low background noise, and high levels of contrast and gradation can be obtained at high speed in accordance with the frame rate of an image-capturing device. In particular, a calculation process for removing background light is readily performed because basically subtraction between adjacent pixels in the horizontal direction of the two-dimensional image-capturing device is used and the time difference of exposure between pixels is small. This reduces blurring of fast-moving objects, and makes it possible to observe highly accurate tomographic images on a consistent basis.

The depth scanning means can be used in combination with the above-mentioned features to enable sectional images in the direction vertical to the optical axis to be continuously acquired to form three-dimensional image information (3D images) of the interior of an object. Furthermore, the optical coherence tomography apparatus can be readily upgraded if the two-dimensional image-capturing device is changed to a high-accuracy, high-sensitivity, and high-speed device, making it possible to obtain a highly practical and economical apparatus.

Further features of the invention, its nature and various advantages will be more apparent from the accompanying drawings and following detailed description of the invention.

DESCRIPTION OF THE PREFERRED EMBODIMENTS

The present invention will now be described in detail with reference to the embodiments shown in the attached drawings.

Figure 1:
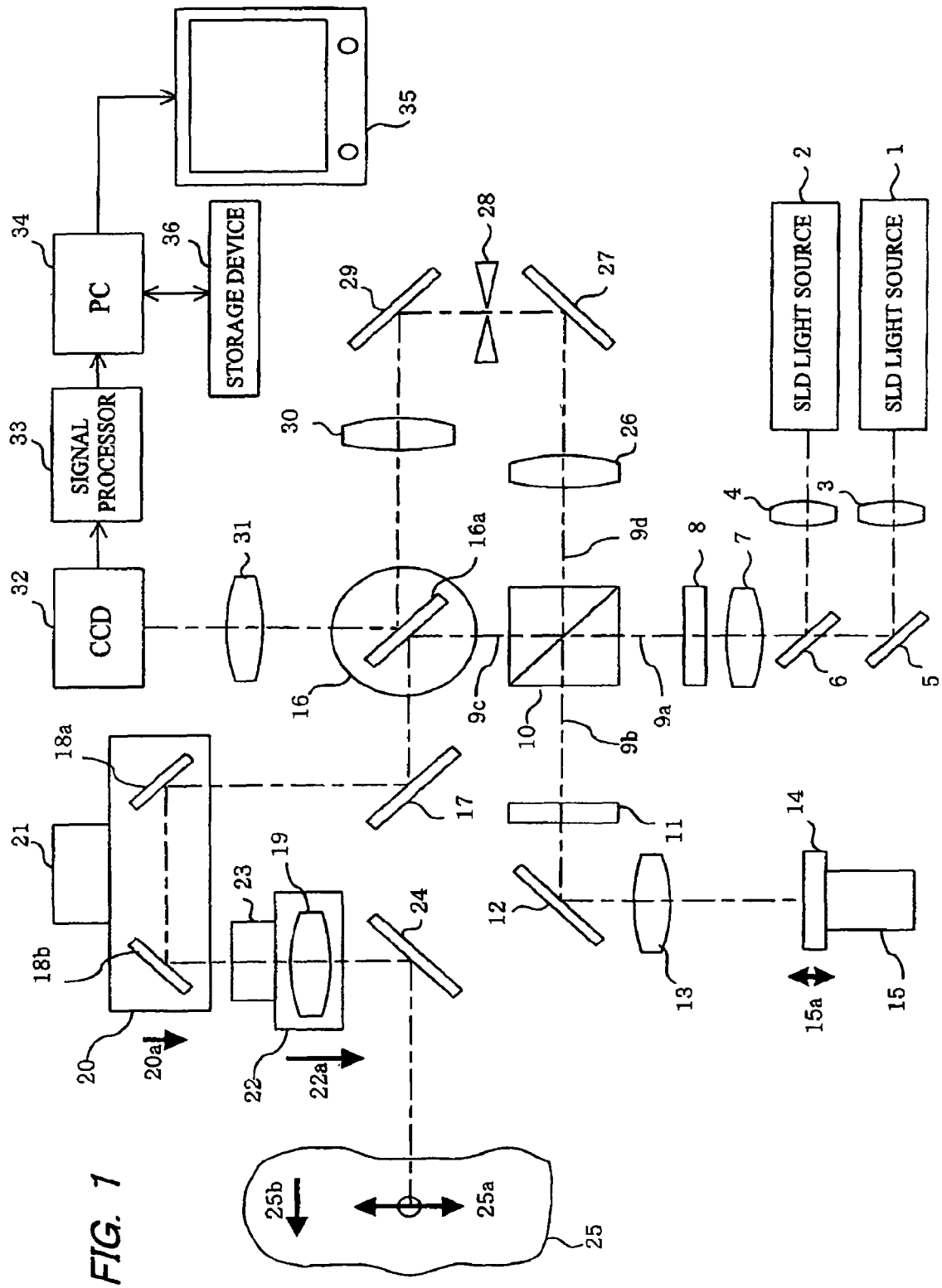
FIG. 1 is a block diagram showing an optical system in one embodiment of an optical coherence tomography apparatus according to the present invention.

FIG. 1 shows an embodiment of an optical coherence tomography apparatus according to the invention that includes light sources 1, 2 respectively comprised of a super luminescent diode (SLD) for emitting partially coherent light having a low-coherence property (little coherence) needed for viewing tomographic images. The light sources 1, 2 generate infrared (invisible) light in different bands having central wavelengths of, for example, 830 nm and 950 nm, respectively. Light beams from the light sources 1, 2 are collimated via lenses 3, 4, and brought onto the same optical axis via a mirror 5 and a dichroic mirror 6.

It is possible for the light sources 1 and 2 to be combined as a single wide-band light source that generate two wavelength bands. Alternatively, the wavelength bands of the light sources 1, 2 may be used separately as necessary. A single SLD or LD (laser diode: semiconductor laser) light source for emitting visible light (for example, the color red having a wavelength of 670 nm) may be provided as an additional light source in FIG. 1. This light source may be used as an auxiliary light source to provide a visible light beam in order to verify the optical path of a beam of the invisible infrared light used for measurement.

The light beam that has traveled via the mirror 5 and the dichroic mirror 6 changes shape to a flat line beam (a light beam that has the image of a line in the focal plane) via a beam expander 7 and a cylindrical lens 8 (columnar lens), and thereafter enters a beam splitter 10 (BS). At the location of the beam splitter 10, the optical path includes four paths: namely, an optical path 9a on the light source side, a reference optical path 9b, a probe optical path 9c, and a detection optical path 9d.

The line beam that travels along the reference optical path 9b is again transformed via a cylindrical lens 11 into a light beam having a circular (or elliptical) cross section. The light beam that has passed through the lens 11 is reflected by a mirror 12 and passes through a lens 13. The light beam then reaches a planar mirror 14 (reference mirror) perpendicular to the optical path and is reflected thereon. The mirror 14 is mounted on a piezoelectric element 15 (piezoelectric vibrator). The vibrator causes the mirror 14 to microvibrate in the optical axis direction (the direction of arrow 15a) at a high frequency of, e.g., several tens of kilohertz to provide beam modulation (periodic phase shifting). The reference mirror 14 and piezoelectric vibrator 15 constitute means for modulating a light beam in the reference optical path.

The length of the reference optical path 9b must be harmonized with the length of the probe optical path 9c so that they are equal. An ND filter or the like (not shown) for adjusting the light intensity is disposed along the reference optical path 9b as necessary.

The line beam that travels along the probe optical path 9c impinges on a mirror 16a (galvano mirror) mounted on a galvanometer 16. The galvano mirror 16a constitutes light beam sweeping means for performing one-dimensional light beam sweeping in a direction orthogonal to the optical axis. The sweeping is performed via the galvano mirror 16a at a frequency that is the same as the frame frequency of a standard TV camera; for example, 30 Hz (or 60 Hz).

The line beam from the galvano mirror 16a is reflected by mirrors 18a, 18b via a mirror 17 to a lens 19. The mirrors 18a, 18b are connected to a motor 21 (stepper motor) via a member 20, whereas the lens 19 is connected to a motor 23 (or a predetermined control mechanism 23 in conjunction with the motor 21) via a member 22. The mirrors 18a, 18b and the lens 19 may be moved in the optical axis direction (the direction shown by arrows 20a, 22a) by the action of the motors 21, 23.

In such a case, the two members 20, 22 are simultaneously moved (the movement shown by arrows 20a, 22a), and the amount of movement made by the two members is set to a 1:2 ratio. This allows light beam sweeping in the depth direction (expansion and contraction of the optical path length and the movement of a focal point) to be performed while the conjugate relationship between the lens 19 and the galvano mirror 16a is maintained. Specifically, the mirrors 18a, 18b and the lens 19 constitute depth-scanning means for varying the focal point position and the optical path length of the light beam within a predetermined range in the optical path of the probe light.

After being reflected by the mirrors 18a, 18b and passing through the lens 19, the light beam gets focused into a linear shape at a predetermined position on an object 25 to be observed after impinging on the mirror 24. The action of the galvano mirror 16a (light beam sweeping means) is used to scan the object 25 using the focused line beam in a direction (X-axis; direction shown by arrow 25a) orthogonal to the linear direction of the beam (Y-axis; vertical direction with respect to the paper). This allows a predetermined surface (X-Y cross section) in the interior of the object 25 to be scanned. The action of the depth-scanning means also enables the object 25 to be scanned simultaneously in the depth direction (Z-axis; direction shown by arrow 25b). In the embodiment shown in FIG. 1, any object may be used as the observation object 25 provided that the object is a biological sample of subcutaneous tissue or another part of a living organism, food, a plant sample, or an industrial component having polymeric properties, or another article that is light-permeable to some extent.

The light reflected from the observation object 25 travels backward via the optical system described above; i.e., via the mirror 24, the lens 19, the mirrors 18b, 18a, the mirror 17, and the galvano mirror 16a; and reaches the beam splitter 10. The light reflected from the object 25, after having traveled backward along the probe optical path 9c and being reflected at the position of the beam splitter 10, mixes with the reference beam returning from the reference optical path 9b, and interference light is produced in the detection optical path 9d. The interference light serves as a detection beam and passes via a lens 26 and a mirror 27 through a detection aperture 28 (slit) that is restricted in gap in the sweeping direction of the galvano mirror 16a. The detection beam then travels via a mirror 29 and a lens 30 and is reflected by a mirrored surface on the reverse of the galvano mirror 16a. After being reflected by the galvano mirror 16a, the detection beam is projected on an imaging surface of a two-dimensional image-capturing device 32 (CCD camera or other two-dimensional imaging means) through a lens 31.

The slit 28 plays an important role in the optical system in terms of eliminating noise created by unnecessary light and scattered light. This improves the SN ratio (signal/noise characteristics) of the detected interference signal and reduces the light intensity level in the background, enabling the gradation of the signal component to be improved in relation to a video signal obtained from the image-capturing device 32. The galvano mirror 16a performs on the front surface thereof the reflection action that causes the light beam of the probe optical path to be swept, and at the same time performs on the rear surface the reflective action that causes the line beam that has passed through the slit 28 to be re-swept to form two-dimensional images on the surface of the image-capturing device 32.

In other words, the lens 26, the mirror 27, the slit 28, the mirror 29, and the lens 30 constitute a recursive optical system for guiding a detection beam that has been guided via the galvano mirror 16*a* (light sweeping means) and the beam splitter 10 once again via the galvano mirror 16*a* (light re-sweeping means) to the two-dimensional image-forming surface of the image-capturing device 32. In the embodiment of FIG. 1, the galvano mirror 16*a* can thus be regarded to serve both as a sweeping means for the probe light and a re-sweeping means for the detection beam due to the reflective effect on the front and rear surfaces thereof.

The output signal from the two-dimensional image-capturing device 32 is input to a signal processor 33 that is connected thereto to perform a variety of signal processes related to the video signal. The signal processor 33 includes a plurality of electronic circuits for performing signal processing using both analog and digital techniques. For example, the signal processor 33 includes electronic circuits such as a logarithmic amplifying circuit, a filter circuit, a delay circuit, a subtraction circuit, an A/D converter, and a variety of digital signal processing circuits. An output signal that has been processed and generated in the signal processor 33 is supplied to a computer 34 (PC).

The PC 34 controls the overall activity of the optical system, causes a video signal obtained via the two-dimensional image-capturing device 32 and the signal processor 33 to be output and displayed on a liquid crystal television monitor or other display unit 35; and, as necessary, performs a control for transferring the video signal to a storage device 36 and storing the signal therein.

Figure 2A:
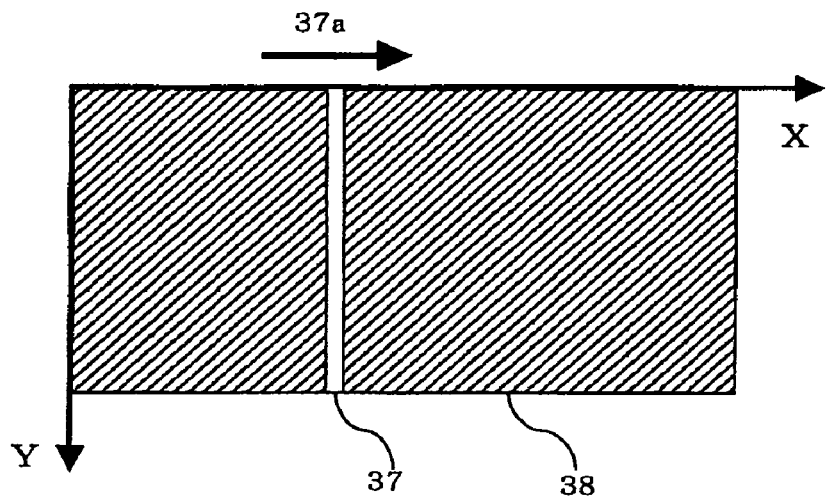
FIG. 2a is a diagram showing a video signal from a two-dimensional image-capturing device.
Figure 2B:
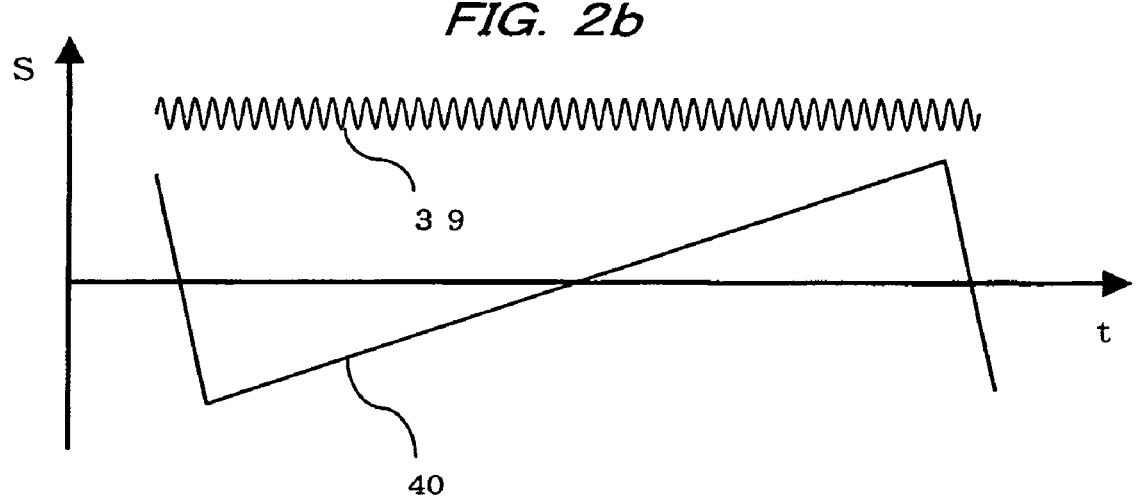
FIG. 2b is a diagram showing a waveform of oscillation of light modulating means and a frame rate of the image-capturing device.
Figure 2C:
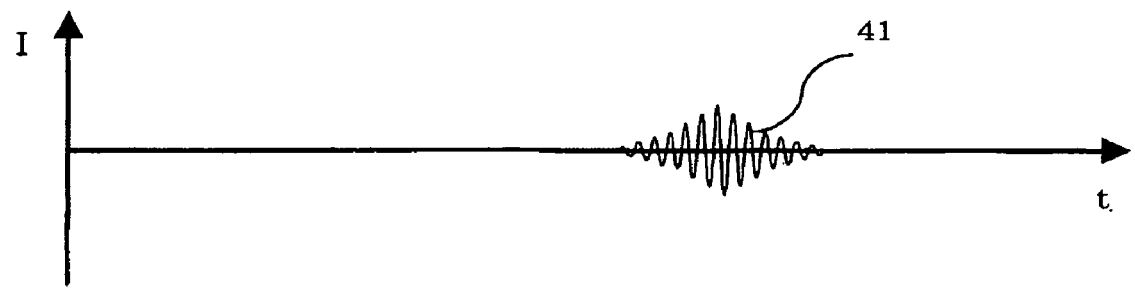
FIG. 2c is a diagram showing a waveform of a detected light beam.

FIGS. 2*a* through 2*c* show how the signal processor 33 in FIG. 1 processes the video signal obtained from the two-dimensional image-capturing device 32. In FIG. 2*a*, the horizontal axis (X-axis) corresponds to the horizontal direction of the image-forming surface of the two-dimensional image-capturing device 32, and the vertical axis (Y-axis) corresponds to the vertical direction of the image-forming surface thereof. The action of the above-mentioned optical system causes a predetermined instantaneous slit image 37 to be developed within a dark background 38 on the image-forming surface of the two-dimensional image-capturing device 32. The slit image 37 is periodically moved in the direction of the X-axis (the direction shown by arrow 37*a*) of FIG. 2*a* in accordance with the sweeping performed by the light sweeping means and the re-sweeping means (the galvano mirror 16*a* shown in FIG. 1).

Due to the action of the light modulating means (reference numerals 14, 15 in FIG. 1), the light beam of the reference optical path receives microvibration (periodic phase shift) in the optical axis direction. This is schematically depicted as an oscillating waveform 39 in FIG. 2*b*. In FIG. 2*b*, the sweeping by the light sweeping means (galvano mirror) is schematically depicted as a waveform 40. As shown in FIG. 2*b*, the oscillating waveform 39 obtained using the light modulating means is controlled at a higher frequency and speed than the sweeping frequency of the galvano mirror 16*a* (corresponding to the waveform 40 and the frame rate of the image-capturing device 32). As one embodiment, assuming the image-capturing device 32 captures an image at a rate of 60 frames per second, the sweeping frequency of the light sweeping means 16*a* (and re-sweeping means) is 60 Hz, and the modulating frequency of the light modulating means is set to, for example, a frequency of 30 kHz to 50 kHz. The modulating frequency can be readily set by a control of the piezoelectric element 15.

According to the interference optical system in OCT, the image-capturing device 32 detects an interference fringe of a predetermined pattern when a reflective component from the interior of the object (specifically, a reflection from boundary surfaces having different reflection factors) is present and the optical path length of the reference optical path coincides with that of the probe optical path. The detected interference fringe signal is subjected to a variety of types of signal processing. An example of a detected waveform obtained from the signal processing is schematically shown in FIG. 2*c* as a waveform 41. The detected waveform 41 is further processed and transformed into a signal component showing reflection intensity information of the interior of the object.

When living tissue, biological samples, and other objects of human origin that have strong diffusion properties are observed, a direct-current (DC component) superimposed as background light often causes the contrast of the detected interference fringe to decrease and the signal component (AC component) of the tomographic image to be smaller than a DC component by an order of magnitude. The effect of the DC component can be eliminated by performing a calculation between adjoining pixels in a video signal from the two-dimensional image-capturing device 32. Specifically, subtraction is performed between adjoining pixels in the horizontal direction (X-axis direction) in order to remove the unnecessary DC component and extract an AC component representative of reflection intensity information from the interior of the object.

The above concept is described below in a more readily understandable manner using a simple numerical system. For example, a signal of the interference fringe detected in horizontally adjoining pixels (three pixels are used as an example) in the two-dimensional image-capturing device 32 can be conveniently noted in the manner below.

$$I_{n-1} = I_D + I_A(-\sin \alpha)$$

$$I_n = I_D + I_A(\cos \alpha)$$

$$I_{n+1} = I_D + I_A(\sin \alpha)$$

$I_{n-1}$, $I_n$, $I_{n+1}$ represent the signal intensities for each of the adjoining pixels, respectively; $I_D$ represents a direct-current component; $I_A$ represents an alternating-current component (signal component of the tomographic image); and $\alpha$ represents the phase of the interference fringe. In the above formulae, the phase difference of the interference fringe between adjoining pixels is presumed to be 90°. This condition can be achieved by appropriately setting the drive frequency and amplitude of the light modulating means according to the control of the light sweeping means.

In an actual measuring system, it is common for $I_D \gg I_A$; i.e., the direct-current component to be predominantly larger than the signal component to be determined. Therefore, as an example, a calculation such as the one below is performed.

$$(I_n - I_{n-1})^2 = I_A^2(1 + 2\cos\alpha \times \sin\alpha)$$

$$(I_{n+1} - I_n)^2 = I_A^2(1 - 2\cos\alpha \times \sin\alpha)$$

Therefore, $$(I_n - I_{n-1})^2 + (I_{n+1} - I_n)^2 = 2I_A^2$$

Specifically, performing subtraction between adjoining pixels allows the unnecessary DC component to be reliably removed. Furthermore, if a simple computation involving an addition, subtraction, and multiplicative calculation is carried out relative to the detection signal of three adjoining pixels, an associated phase term can also be eliminated. Such computations enable the necessary AC component (signal component) to be readily extracted.

In practical application, the use of an analog delay circuit and subtraction circuit enables computations such as subtraction between horizontal pixels to be executed quickly, simply, and accurately irrespective of digital gradation. Once such analog processing has been performed, the A/D converter circuit and the digital computation circuit are used to perform more complex computations in order to make further improvements in noise reduction and image quality, and more readily extract reflection intensity information of the interior of the object. The system of the present invention has an extremely small difference in exposure time between adjoining pixels as an optical principle. Therefore, even if the object is a moving living organism, little blurring will occur at the time of tomography. This allows a very accurate image with exceptional resolution, gradation, and contrast to be produced.

Figure 3:
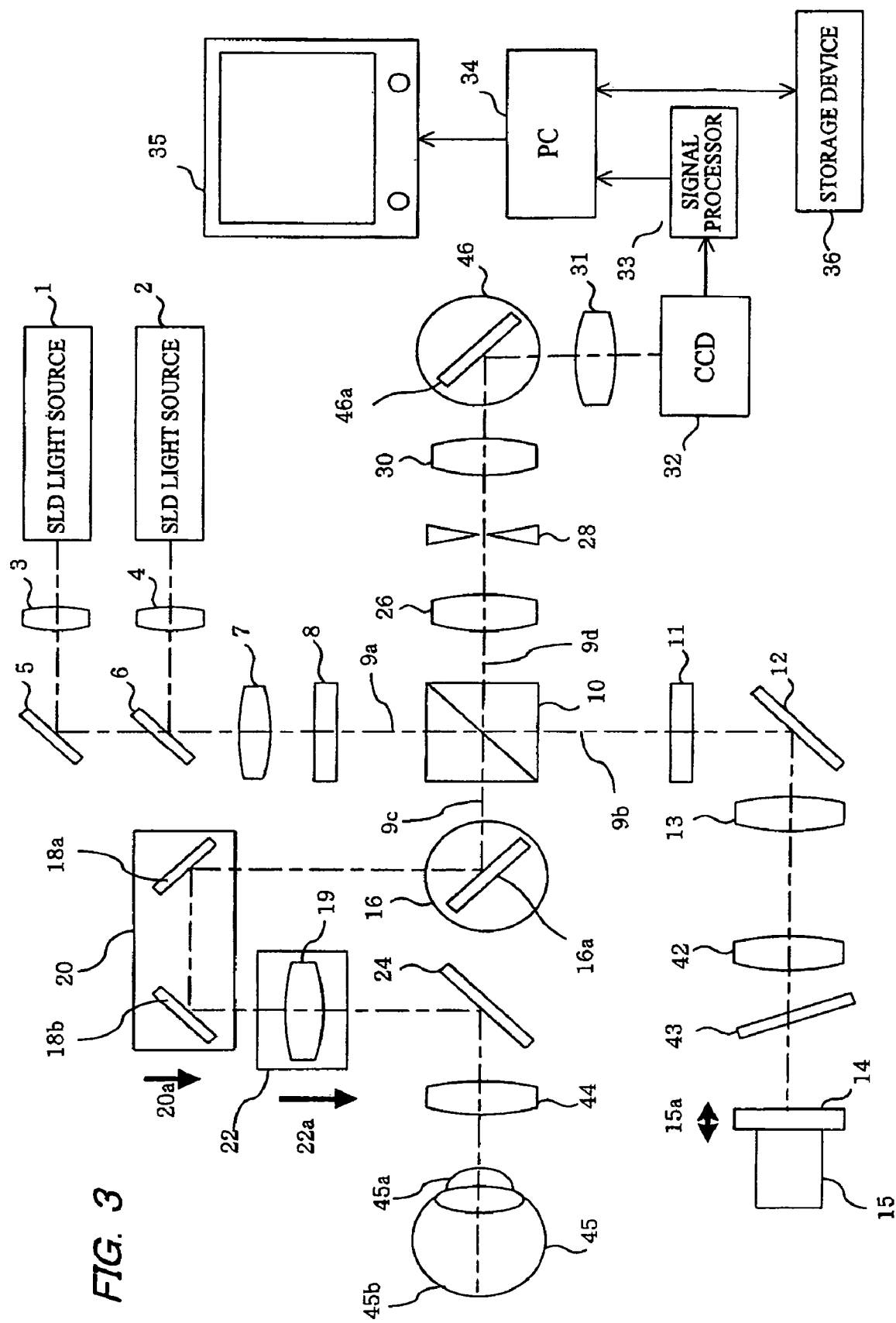
FIG. 3 is a block diagram showing an optical system in another embodiment of an optical coherence tomography apparatus according to the present invention.

FIG. 3 shows another embodiment of an optical coherence tomography apparatus, wherein the object to be measured is assumed to be a human eyeball, and an optical system is preferably adapted for use in eye examinations. Structural elements in FIG. 3 that are the same as those in FIG. 1 are indicated using the same reference symbols. The description below primarily focuses on points that differ from FIG. 1.

Light beams from light sources (SLD) 1, 2 for observing tomographic images pass through a cylindrical lens 8 and assume a linear shape at the focal position. A beam splitter 10 splits the light beam into two directions; i.e., a reference optical path 9b and a probe optical path 9c. The light beam that has traveled over the reference optical path 9b is guided to a mirror 14 via a cylindrical lens 11, mirror 12, and lens 13 and 42. The mirror 14 is mounted on a piezoelectric element 15, and is able to modulate (perform periodic phase shifting of) the light beam.

A shutter 43 is provided in the reference optical path near the mirror 14. The shutter 43 can be used to block the reference optical path as necessary and obtain a typical reflected image that differs from an interference image.

The light beam that travels over a probe optical path 9c is subjected to a one-dimensional sweep by a galvano mirror 16a. After passing through mirrors 18a, 18b, a lens 19, and a mirror 24, the scanning light beam passes through a lens 44, and impinges on an eye 45 to be examined (an anterior ocular segment 45a or an ocular fundus 45b). The lenses 19, 44 constitute a telecentric optical system, and uniformly maintain the conjugate relationship between the galvano mirror 16a and the eye to be examined.

The mirrors 18a, 18b are secured to a motor (not shown; corresponding to the motor 21 shown in FIG. 1) by a member 20 in the same manner as in the embodiment of FIG. 1, and can be moved in the optical axis direction (direction of arrow 20a). The lens 19 is held on a member 22 that is moved by a motor (not shown; corresponding to the motor 23 shown in FIG. 1), and has a structure allowing the member 22 to be moved (in the direction 22a) at the same time the member 20 is moved. Assuming that the ratio of movement made by members 20 and 22 is set to 1:2, the galvano mirror 16a is maintained to be conjugate with the anterior ocular segment 45a of the eye to be examined. This allows the accurate scanning in the depth direction by the light beam (changing the optical path length and moving the focal point position).

Light reflected from a predetermined area of the eye to be examined, e.g., the fundus 45b, moves back over the above-described optical path, mixes in the beam splitter 10 with the reference light that has traveled over the reference optical path 9b, and is guided over the detection optical path 9d to produce an interference signal, which then passes through a detection aperture 28 (slit) via a lens 26. The detection aperture 28 has the effect of eliminating unnecessary optical noise, improving the SN ratio of the interference signal, and improving contrast and the gradation of the signal.

The interference signal that has passed through the detection aperture 28 is guided via a lens 30 to a galvano mirror 46a that is mounted on a galvanometer 46. The galvano mirror 46a (second light sweeping means) constitutes re-sweeping means for performing a detection beam sweep in the same sweeping direction as the galvano mirror 16a (first light sweeping means), and the sweeping frequencies of the two galvano mirrors 16a, 46a are set to be the same. The detection beam (interference light) that has been swept again by the galvano mirror 46a forms an image on a CCD or other two-dimensional image-capturing device 32 via a lens 31.

In the configuration shown in FIG. 3, if the frame rate of the two-dimensional image-capturing device 32 is 60 frames per second, the sweeping frequencies of the galvano mirrors 16a, 46a are, for example, also 60 Hz, respectively. The configuration shown in FIG. 3 involves the use of two galvano mirrors, but is advantageous because the redirecting mirrors (27, 29) in FIG. 1 are not necessary. This improves the efficiency of the detection optical system and facilitates adjustment of the optical path.

The video signal output from the image-capturing device 32 is subjected to a variety of computation processes in a signal processor 33 and processed between adjoining pixels to extract a predetermined tomographic image. The resulting tomographic image is displayed on a liquid crystal monitor display means 35 via a PC 34, and may be stored on a storage device 36 if needed.

Figure 4A:
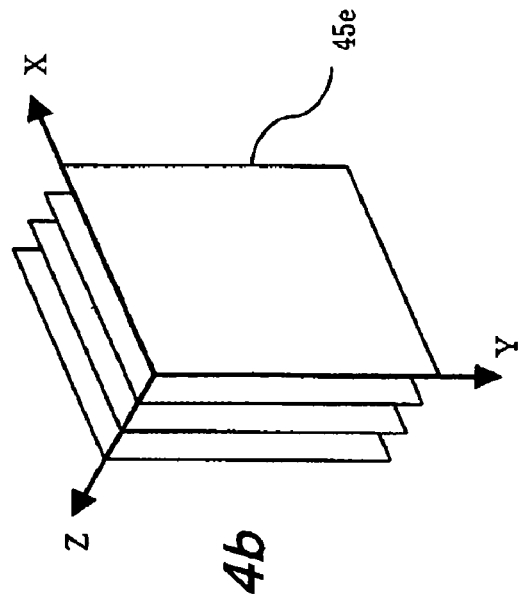
FIG. 4a is an illustrative view showing a coordinate system that can be assumed for an eyeball.
Figure 4B:
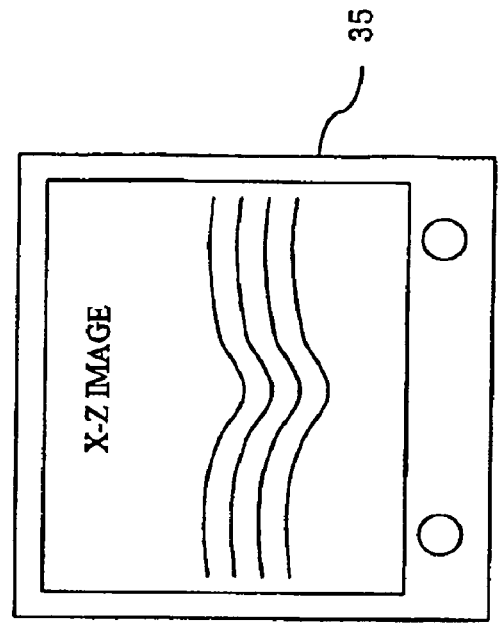
FIG. 4b is an illustrative view showing a plurality of X-Y images sampled in the direction of the Z-axis.

FIGS. 4a through 4d show an illustrative diagram of a case in which a human eyeball is assumed to be the object to be observed. FIG. 4a shows a coordinate system that can be assumed for an eyeball. As shown in FIG. 4a, a system used to measure a human eye produces an X-Y image 45c in a direction orthogonal to the optical axis (eyeball axis) of the eye 45 to be examined, a Y-Z image 45d in a direction along the optical axis thereof and an X-Z image (not shown in FIG. 4a). The image-capturing device 32 and the signal processor 33 in the present invention produce the video signal which corresponds to an X-Y image. This image represents a cross-section in the direction orthogonal to the optical axis. A plurality of X-Y images 45e are sampled in the direction of the Z-axis as shown in FIG. 4b according to the scan performed by the depth scanning means (18a, 18b, 19 in FIG. 3) in order to obtain three-dimensional information of the interior of the eye to be examined.

Figure 4C:
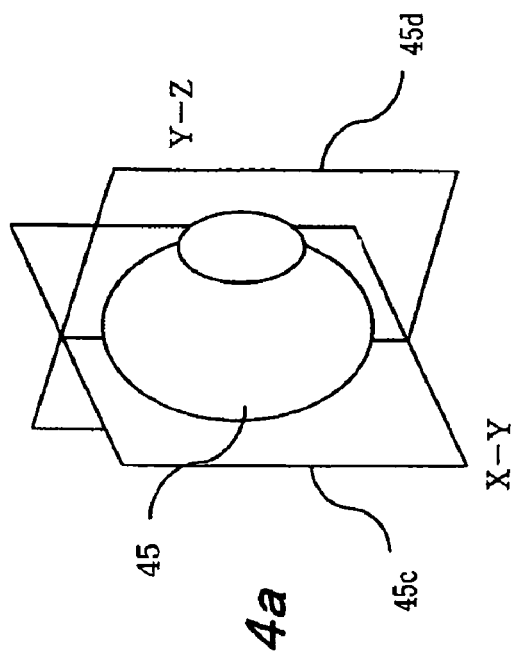
FIG. 4c is an illustrative view showing an example of a three-dimensional image of an ocular fundus to be examined.

FIG. 4c is a diagram showing an example of when three-dimensional information of the fundus or other part inside the eye to be examined has been sampled. The images are subjected to a variety of software-driven image processes via the PC 34 (refer to FIG. 3) to produce images having a visually displayable format, and they are displayed on a monitor screen of the image displaying device 35.

Figure 4D:
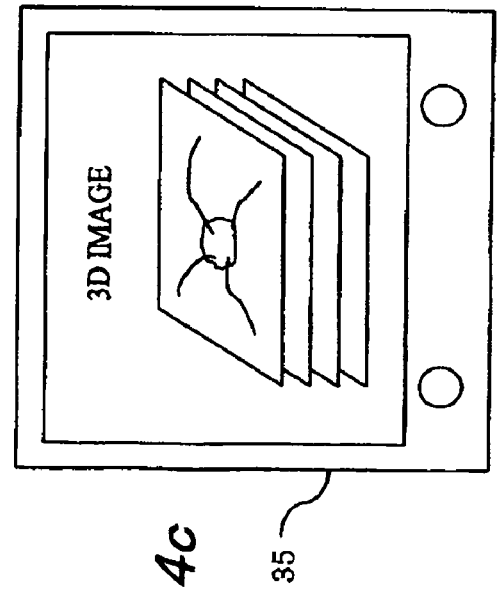
FIG. 4d is an illustrative view showing cross-sectional images in the X-Z direction of the ocular fundus.

FIG. 4d is a diagram showing an example of when the image data extracted in the model shown in FIG. 4b has been subjected to additional image processing to detect a cross-section in the X-Z direction of the fundus. An example of an important application of OCT in clinical medicine is that tomographic images of the fundus such as described above can be used effectively in making accurate diagnoses or performing surgical planning for a variety of critical ophthalmic disorders such as retinal degeneration and retinal detachment.

What is claimed is:

1. An optical coherence tomography apparatus in which a light beam from a light source is swept to irradiate a predetermined region of an object to be observed, and optical interference is used to detect light reflected from the object in order to derive therefrom tomographic information of the object, the apparatus comprising:

a light source for generating a low-coherent light beam;

a beam splitting element for splitting the light beam from the light source into a probe light beam toward the object and a reference light beam toward a reference optical path;

light sweeping means for one-dimensionally sweeping the probe light beam at a predetermined frequency;

re-sweeping means for sweeping in the same direction and at the same frequency as the light sweeping means an interference light beam that is produced by interference between the probe light beam from the object and the reference light beam that has traveled along the reference optical path;

two-dimensional image-capturing means for detecting the re-swept interference light beam at a frame rate corresponding to a sweeping frequency of the light sweeping means and the re-sweeping means; and signal processing means for processing a video signal output from the two-dimensional image-capturing means to derive therefrom reflection intensity information of an interior of the object.

2. An optical coherence tomography apparatus according to claim 1, wherein the video signal output from the two-dimensional image-capturing means is processed between adjoining pixels, and a direct-current component is removed to derive the reflection intensity information of the interior of the object.

3. An optical coherence tomography apparatus according to claim 1, further comprising depth scanning means for varying a focal point and an optical path length of the probe light beam to scan the object in the depth direction in order to derive therefrom three-dimensional tomographic image information of the interior of the object.

4. An optical coherence tomography apparatus according to claim 1, wherein the light beam is a slit-shaped light beam, and the interference light beam is guided to the two-dimensional image-capturing means via a slit-shaped detection aperture disposed between the light sweeping means and the re-sweeping means.

5. An optical coherence tomography apparatus according to 1, wherein the light sweeping means comprises a reflective mirror mounted on a galvanometer, and a direction in which a scan is performed by the light sweeping means corresponds to a horizontal direction in which images are captured by the two-dimensional image-capturing means.

6. An optical coherence tomography apparatus according to claim 5, wherein the reflective mirror of the sweeping means is used as the re-sweeping means and a reverse side of the reflective mirror thereof is used to sweep the interference light beam that enters the two-dimensional image-capturing means.

7. An optical coherence tomography apparatus according to claim 5, wherein the re-sweeping means comprise a second galvanometer that differs from the galvanometer of the light sweeping means, and a reflective mirror mounted on the second galvanometer performs a sweep for the interference light beam that enters the two-dimensional image-capturing means.

8. An optical coherence tomography apparatus in which a light beam from a light source is swept to irradiate a predetermined region of an object to be observed, and optical interference is used to detect light reflected from the object in order to derive therefrom tomographic information of the object, the apparatus comprising:

a light source for generating a low-coherent light beam;

a beam splitting element for splitting the light beam from the light source into a probe light beam toward the object and a reference light beam toward a reference optical path;

light sweeping means for one-dimensionally sweeping the probe light beam at a predetermined frequency;

light modulating means for modulating the reference light beam such that the phase thereof periodically shifts at a higher frequency than the sweeping frequency of the light sweeping means;

re-sweeping means for sweeping in the same direction and at the same frequency as the light sweeping means an interference light beam that is produced by interference between the probe light beam from the object and the reference light beam that is modulated by the light modulating means;

two-dimensional image-capturing means for detecting the re-swept interference light beam at a frame rate corresponding to a sweeping frequency of the light sweeping means and the re-sweeping means; and signal processing means for processing a video signal from the two-dimensional image-capturing means to extract interference information dependent on light modulation by the light modulation means and derive therefrom reflection intensity information of an interior of the object.

9. An optical coherence tomography apparatus according to claim 8, wherein the video signal output from the two-dimensional image-capturing means is processed between adjoining pixels, and a direct-current component is removed to extract the interference information and derive therefrom the reflection intensity information of the interior of the object.

10. An optical coherence tomography apparatus according to claim 8, further comprising depth scanning means for varying a focal point and an optical path length of the probe light beam to scan the object in the depth direction in order to derive therefrom three-dimensional tomographic image information of the interior of the object.

11. An optical coherence tomography apparatus according to claim 8, wherein the light beam is a slit-shaped light beam, and the interference light beam is guided to the two-dimensional image-capturing means via a slit-shaped detection aperture disposed between the light sweeping means and the re-sweeping means.

12. An optical coherence tomography apparatus according to 8, wherein the light sweeping means comprises a reflective mirror mounted on a galvanometer, and a direction in which a scan is performed by the light sweeping means corresponds to a horizontal direction in which images are captured by the two-dimensional image-capturing means.

13. An optical coherence tomography apparatus according to claim 12, wherein the reflective mirror of the sweeping means is used as the re-sweeping means and a reverse side of the reflective mirror thereof is used to sweep the interference light beam that enters the two-dimensional image-capturing means.

14. An optical coherence tomography apparatus according to claim 12, wherein the re-sweeping means comprise a second galvanometer that differs from the galvanometer of the light sweeping means, and a reflective mirror mounted on the second galvanometer performs a sweep for the interference light beam that enters the two-dimensional image-capturing means.

15. An optical coherence tomography apparatus according to claim 8, wherein the repeating frequency of the phase shifting performed by the light modulating means is set two or more orders of magnitude greater than the sweeping frequency of the sweeping and the re-sweeping means and the frame rate of the two-dimensional image-capturing means.

16. An optical coherence tomography apparatus in which a light beam from a light source is swept to irradiate a predetermined region of an object to be observed, and optical interference is used to detect light reflected from the object in order to derive therefrom tomographic information of the object, the apparatus comprising:
- a light source for generating a low-coherent light beam;
- a beam splitting element for splitting the light beam from the light source into a probe light beam toward the object and a reference light beam toward a reference optical path;
- light sweeping means for one-dimensionally sweeping the probe light beam at a predetermined frequency;
- light modulating means for modulating the reference light beam such that the phase thereof periodically shifts at a higher frequency than the sweeping frequency of the light sweeping means;
- a recursive optical system for guiding to the light sweeping means an interference light beam that is produced by interference between the probe light beam from the object and the reference light beam that is modulated by the light modulating means;
- two-dimensional image-capturing means for detecting the interference light beam that has passed through the recursive optical system at a frame rate corresponding to a sweeping frequency of the light sweeping means; and
- signal processing means for processing a video signal from the two-dimensional image-capturing means to extract interference information dependent on light modulation by the light modulation means and derive therefrom reflection intensity information of an interior of the object.

17. An optical coherence tomography apparatus according to claim 16, wherein a predetermined detection aperture having a slit that is restricted in the sweeping direction of the light sweeping means is disposed on the optical path of the recursive optical system, and the interference light beam is guided to the two-dimensional image-capturing means via the detection aperture.

18. An optical coherence tomography apparatus according to claim 16, wherein the video signal output from the two-dimensional image-capturing means is processed between adjoining pixels, and a direct-current component is removed to extract the interference information and derive therefrom the reflection intensity information of the interior of the object.

19. An optical coherence tomography apparatus in which a light beam from a light source is swept to irradiate a predetermined region of an object to be observed, and optical interference is used to detect light reflected from the object in order to derive therefrom tomographic information of the object, the apparatus comprising:
- a light source for generating a low-coherent light beam;
- a beam splitting element for splitting the light beam from the light source into a probe light beam toward the object and a reference light beam toward a reference optical path;
- first light sweeping means for one-dimensionally sweeping the probe light beam at a predetermined frequency;
- light modulating means for modulating the reference light beam such that the phase thereof periodically shifts at a higher frequency than the sweeping frequency of the first light sweeping means;
- second light sweeping means for sweeping in the same direction and at the same frequency as the first light sweeping means an interference light beam that is produced by interference between the probe light beam from the object and the reference light beam that is modulated by the light modulating means;
- two-dimensional image-capturing means for detecting the interference light beam that has passed through the second light sweeping means at a frame rate corresponding to a sweeping frequency of the first and second light sweeping means; and
- signal processing means for processing a video signal from the two-dimensional image-capturing means to extract interference information dependent on light modulation by the light modulation means and derive therefrom reflection intensity information of an interior of the object.

20. An optical coherence tomography apparatus according to claim 19, wherein a predetermined detection aperture having a slit that is restricted in the sweeping direction of the first and second light sweeping means is disposed on the optical path between the first and second light sweeping means, and the interference light beam is guided to the two-dimensional image-capturing means via the detection aperture.

21. An optical coherence tomography apparatus according to claim 19, wherein the video signal output from the two-dimensional image-capturing means is processed between adjoining pixels, and a direct-current component is removed to extract the interference information and derive therefrom the reflection intensity information of the interior of the object.

* * * * *